(12) United States Patent
Korenaga et al.

(10) Patent No.: US 11,215,634 B2
(45) Date of Patent: Jan. 4, 2022

(54) VEHICLE-MOUNTED DEVICE, CALCULATION DEVICE, AND PROGRAM

(71) Applicant: MITSUBISHI HEAVY INDUSTRIES MACHINERY SYSTEMS, LTD., Hyogo (JP)

(72) Inventors: Takeshi Korenaga, Tokyo (JP); Tomokazu Shimoda, Tokyo (JP); Kazuyoshi Kitajima, Tokyo (JP); Hiromichi Nakamoto, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 123 days.

(21) Appl. No.: 16/498,015

(22) PCT Filed: Mar. 29, 2017

(86) PCT No.: PCT/JP2017/013102
§ 371 (c)(1),
(2) Date: Sep. 26, 2019

(87) PCT Pub. No.: WO2018/179189
PCT Pub. Date: Oct. 4, 2018

(65) Prior Publication Data
US 2020/0025794 A1  Jan. 23, 2020

(51) Int. Cl.
*G01P 15/18* (2013.01)
*G01P 3/00* (2006.01)

(52) U.S. Cl.
CPC ............... *G01P 15/18* (2013.01); *G01P 3/00* (2013.01)

(58) Field of Classification Search
CPC .................................. G01P 15/18; G01P 3/00
See application file for complete search history.

(56) References Cited

U.S. PATENT DOCUMENTS

2008/0077301 A1  3/2008  Suzuki et al.

FOREIGN PATENT DOCUMENTS

| JP | H0995276 A | | 4/1997 |
|----|-----------|---|--------|
| JP | 2008075761 A | | 4/2008 |
| JP | 2008225735 A | * | 9/2008 |
| JP | 2008225735 A | | 9/2008 |
| JP | 2013072781 A | | 4/2013 |
| JP | 2015203726 A | | 11/2015 |

OTHER PUBLICATIONS

International Search Report and Written Opinion of International Application No. PCT/JP2017/013102 dated May 30, 2017; 14pp.

* cited by examiner

*Primary Examiner* — Manuel L Barbee
(74) *Attorney, Agent, or Firm* — Kanesaka Berner and Partners LLP

(57) ABSTRACT

This vehicle-mounted device is a vehicle-mounted device mounted on a vehicle that has a body and a steering unit supported on the body via a steering shaft, and includes a user interface, camera, or antenna attached to the steering unit; a first sensor unit that is attached to the body and detects a first angular velocity or a first acceleration as a first detection value; and a calculation device that performs calculation based on the first detection value and is connected to the user interface, camera, or antenna.

5 Claims, 6 Drawing Sheets

VEHICLE-MOUNTED DEVICE, CALCULATION DEVICE, AND PROGRAM

RELATED APPLICATIONS

The present application is a National Phase of International Application Number PCT/JP2017/013102 filed Mar. 29, 2017.

TECHNICAL FIELD

The present invention relates to a vehicle-mounted device, a calculation device, and a program.

BACKGROUND ART

At present, vehicle-mounted devices, such as a vehicle navigation system that utilizes a global Navigation satellite system (GNSS), utilizes information on various sensors, such as mounted acceleration sensor and angular-velocity sensor, and performs positioning of a vehicle, are known.

As a technique related to this, PTL 1 discloses a technique in which display of the vehicle navigation system is attached so as to rotate together with a handlebar of a motorcycle.

CITATION LIST

Patent Literature

[PTL 1] Japanese Unexamined Patent Application Publication No. 9-95276

SUMMARY OF INVENTION

Technical Problem

However, if an acceleration sensor and an angular-velocity sensor of the vehicle-mounted device are attached to a steering unit of a vehicle, not only information on the movement of a body of the vehicle to be detected but also information in which the movement of the steering unit are mixed may be detected.

Thus, an object of the invention is to provide a vehicle mounted device in which, even if the vehicle-mounted device is mounted on a steering unit of a vehicle, an acceleration or angular velocity to be detected is not easily influenced by movement of the steering unit of the vehicle.

Solution to Problem

A vehicle-mounted device (100, 100') of a first aspect is mounted on a vehicle (BK) having a body (BD) and a steering unit (HDL) supported on the body via a steering shaft (SHT), and includes a user interface (16), a camera (17), or an antenna (13) that is attached to the steering unit; a first sensor unit (20) that is attached to the body and detects a first angular velocity or a first acceleration as a first detection value; and a calculation device (12, 12') that performs a calculation based on the first detection value and is connected to the user interface, the camera, or the antenna.

According to this aspect, the vehicle-mounted device detects the angular velocity or the acceleration by the sensor unit attached to the body of the vehicle. For this reason, even if the user interface, the camera, or the antenna is mounted on the steering unit of the vehicle, the vehicle-mounted device can detect the first angular velocity or the first acceleration in association with the movement of the body of the vehicle.

Hence, even if the vehicle-mounted device is mounted on the steering unit of the vehicle, the acceleration or the angular velocity to be detected is not easily influenced by the movement of the steering unit of the vehicle.

The vehicle-mounted device of a second aspect is the vehicle-mounted device of the first aspect that further includes a second sensor unit (21) that is attached to the steering unit and detects a second angular velocity or a second acceleration as a second detection value; and a steering angle calculation unit (15c') that calculates a steering angle of the steering unit with respect to the body on the basis of the first detection value and the second detection value.

According to this aspect, the vehicle-mounted device can detect the steering angle. For this reason, the vehicle-mounted device can add steering angle information to the acquired information. Moreover, driving analysis utilizing a relationship between the steering angle and the angular velocity or acceleration of the body of the vehicle can be performed.

The vehicle-mounted device of a third aspect is the vehicle-mounted device of the second aspect in which a difference of a second rotational angle of the steering unit obtained from the second detection value with respect to a first rotational angle of the body obtained from the first detection value is calculated as the steering angle.

According to this aspect, the vehicle-mounted device calculates the difference of the rotational angle of the handle with respect to the rotational angle of the body. For this reason, the vehicle-mounted device can detect the steering angle simply by performing the calculation processing of the difference of the rotational angle.

The vehicle-mounted device of a fourth aspect is the vehicle-mounted device of the first to third aspects in which n the vehicle is a two-wheel vehicle.

According to this aspect, the vehicle-mounted device detects the angular velocity or the acceleration by the sensor unit attached to the body of the two-wheel vehicle. For this reason, even if the user interface, the camera, or the antenna is mounted on the steering unit of the two-wheel vehicle, the vehicle-mounted device can detect the first angular velocity or the first acceleration in association with the movement of the body of the two-wheel vehicle.

A calculation device of a fifth aspect is a calculation device for a vehicle-mounted device that is mounted on a vehicle having a body and a steering unit supported on the body via a steering shaft and includes a user interface, a camera, or an antenna that is attached to the steering unit; a first sensor unit that is attached to the body and detects a first angular velocity or a first acceleration as a first detection value; and a second sensor unit that is attached to the steering unit and detects a second angular velocity or a second acceleration as a second detection value, the calculation device including a first rotational angle acquisition unit (15a') that acquires the first detection value and acquires a first rotational angle on the basis of the first detection value; a second rotational angle acquisition unit (15b') that acquires the second detection value and acquires a second rotational angle on the basis of the second detection value; and a steering angle calculation unit that calculates and outputs a steering angle of the steering unit with respect to the body on the basis of the first rotational angle and the second rotational angle.

A program of a sixth aspect is a program for a computer of a vehicle-mounted device that is mounted on a vehicle having a body and a steering unit supported on the body via a steering shaft and includes a user interface, a camera, or an antenna that is attached to the steering unit; a first sensor unit that is attached to the body and detects a first angular velocity or a first acceleration as a first detection value; and a second sensor unit that is attached to the steering unit and detects a second angular velocity or a second acceleration as a second detection value, the program causing the computer to function as a first rotational angle acquisition unit that acquires the first detection value and acquires a first rotational angle on the basis of the first detection value; a second rotational angle acquisition unit that acquires the second detection value and acquires a second rotational angle on the basis of the second detection value; and a steering angle calculation unit that calculates and outputs a steering angle of the steering unit with respect to the body on the basis of the first rotational angle and the second rotational angle.

Advantageous Effects of Invention

According to one aspect of the invention, even if the vehicle-mounted device is mounted on the steering unit of the vehicle, the acceleration or the angular velocity to be detected is not easily influenced by the movement of the steering unit of the vehicle.

DESCRIPTION OF EMBODIMENTS

Hereinafter, various embodiments related to the invention will be described with reference to the drawings.

First Embodiment

A first embodiment of a vehicle-mounted device related to the invention will be described with reference to FIGS. 1 to 4.

(Entire Configuration)

An entire configuration of a vehicle-mounted device 100 will be described.

Figure 1:
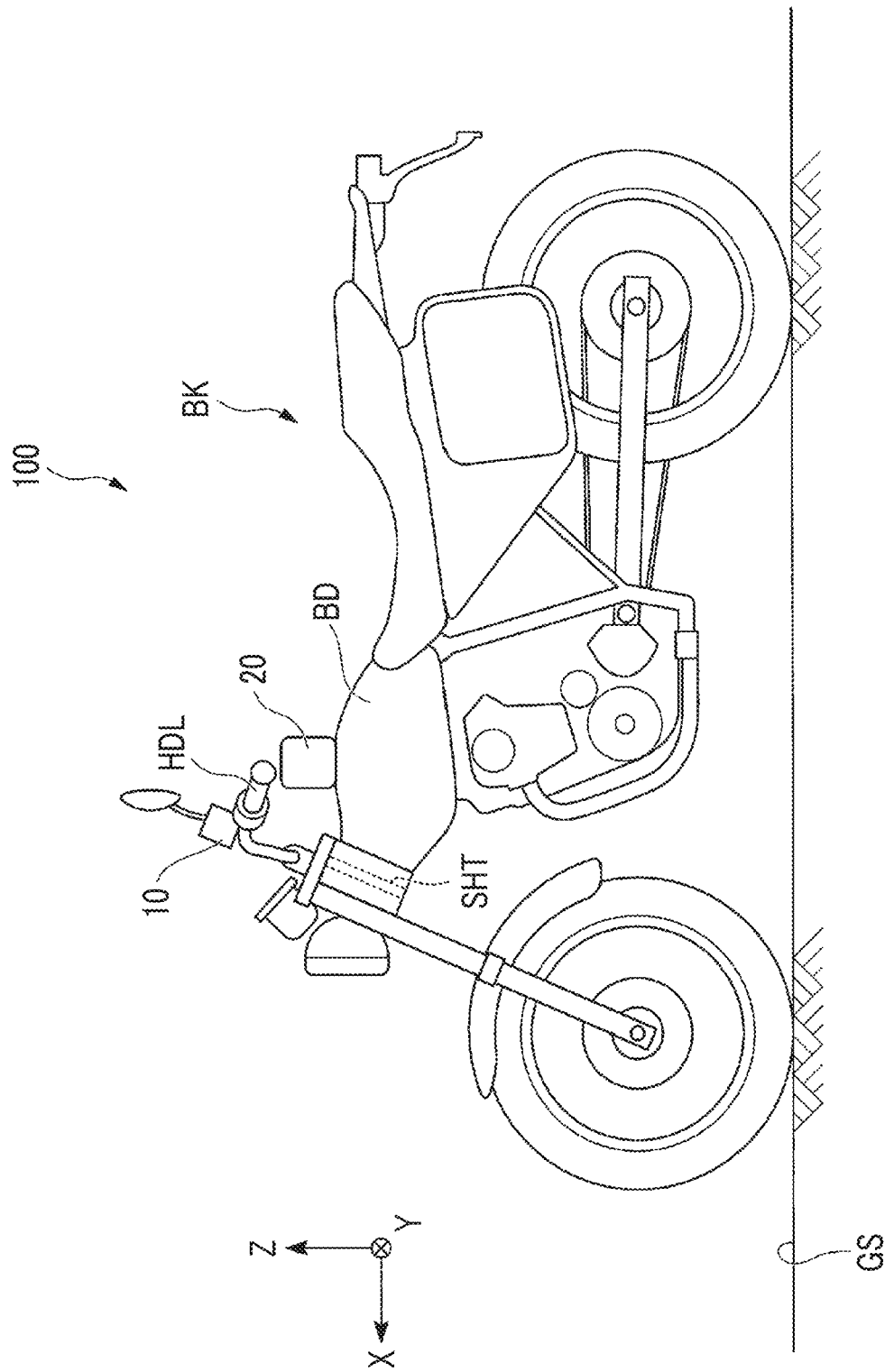
FIG. 1 is a schematic view of a vehicle-mounted device related to a first embodiment of the invention.

In the present embodiment, the vehicle-mounted device 100 is a vehicle navigation system, and as illustrated in FIG. 1, is mounted on a two-wheel vehicle BK.

The two-wheel vehicle BK includes a body BD, a handle HDL (steering unit), and a handle shaft SHT (steering shaft). The handle HDL is supported by the body BD via the handle shaft SHT.

The vehicle-mounted device 100 is separately attached to at least two portions of a portion provided in the handle HDL of the two-wheel vehicle BK and a portion provided in the body BD.

Additionally, in the present embodiment, the vehicle-mounted device 100 utilizes a global navigation satellite system (GNSS), uses autonomous navigation based on measurement information of various sensors to be described below in combination, and performs positioning of the two-wheel vehicle BK. Hence, irrespective of whether or not radio waves are received from the GNSS satellites, the vehicle-mounted device 100 performs the positioning of the two-wheel vehicle BK, sequentially acquires the current position of the two-wheel vehicle BK, and performs driving support, driving analysis, and the like.

The vehicle-mounted device 100 includes a body part 10 and a first sensor unit 20.

In the present embodiment, the body part 10 is attached to the handle HDL of the two-wheel vehicle BK, and the first sensor unit 20 is attached to the body BD of the two-wheel vehicle BK.

The body part 10 and the first sensor unit 20 are connected to each other by a wired or wireless communication line for transmission and reception of respective kinds of information.

Here, an orthogonal system will be described.

In the present embodiment, three orthogonal systems of a road surface orthogonal system Qw, a body orthogonal system Qb, and a handle orthogonal system Qh are defined.

As illustrated in FIG. 1, the road surface orthogonal system Qw is an orthogonal system that has an XY plane as the road surface GS and is composed of an X-axis, a Y-axis, and a Z-axis. As illustrated in FIG. 1, in a case where the two-wheel vehicle BK stands upright in the vertical direction without being tilted with respect to the road surface GS and travels in an X-axis normal direction, as the two-wheel vehicle BK is seen from the front, a leftward direction is a Y-axis normal direction, and an upward direction is a Z-axis normal direction.

The body orthogonal system Qb is an orthogonal system in which the road surface orthogonal system Qw is rotated in accordance with the rotation of the body BD of the two-wheel vehicle BK with respect to the road surface GS. The body orthogonal system Qb is composed of a Xb-axis, a Yb-axis, and a Zb-axis. The Xb-axis is associated with the X-axis, the Yb-axis is associated with the Y-axis, and the Zb-axis is associated with the Z-axis.

The handle orthogonal system Qh is an orthogonal system in which the road surface orthogonal system Qw is rotated in accordance with the rotation of the handle HDL of the two-wheel vehicle BK with respect to the road surface GS. The handle orthogonal system Qh is composed of an Xh-axis, a Yh-axis, and a Zh-axis. The Xh-axis is associated with the X axis, the Yh-axis is associated with the Y-axis, and the Zh-axis is associated with the Z-axis.

(First Sensor Unit)

Details of the first sensor unit 20 will be described.

The first sensor unit 20 detects a first angular velocity to be described below, as a first detection value.

In the present embodiment, the first sensor unit 20 has a gyro sensor, and measures a three-axis angular velocity.

Additionally, in the present embodiment, the first sensor unit 20 is fixed to the body BD of the two-wheel vehicle BK. For this reason, the first sensor unit 20 measures three-axis angular velocities along respective axes of the Xb-axis, the Yb-axis, and the Zb-axis of the body orthogonal system Qb.

The first sensor unit 20 detects the measured first angular velocity as the first detection value, and outputs the first detection value to a positioning chip 12 to be described below.

(Body Part)

Details of the body part 10 will be described.

Figure 2:
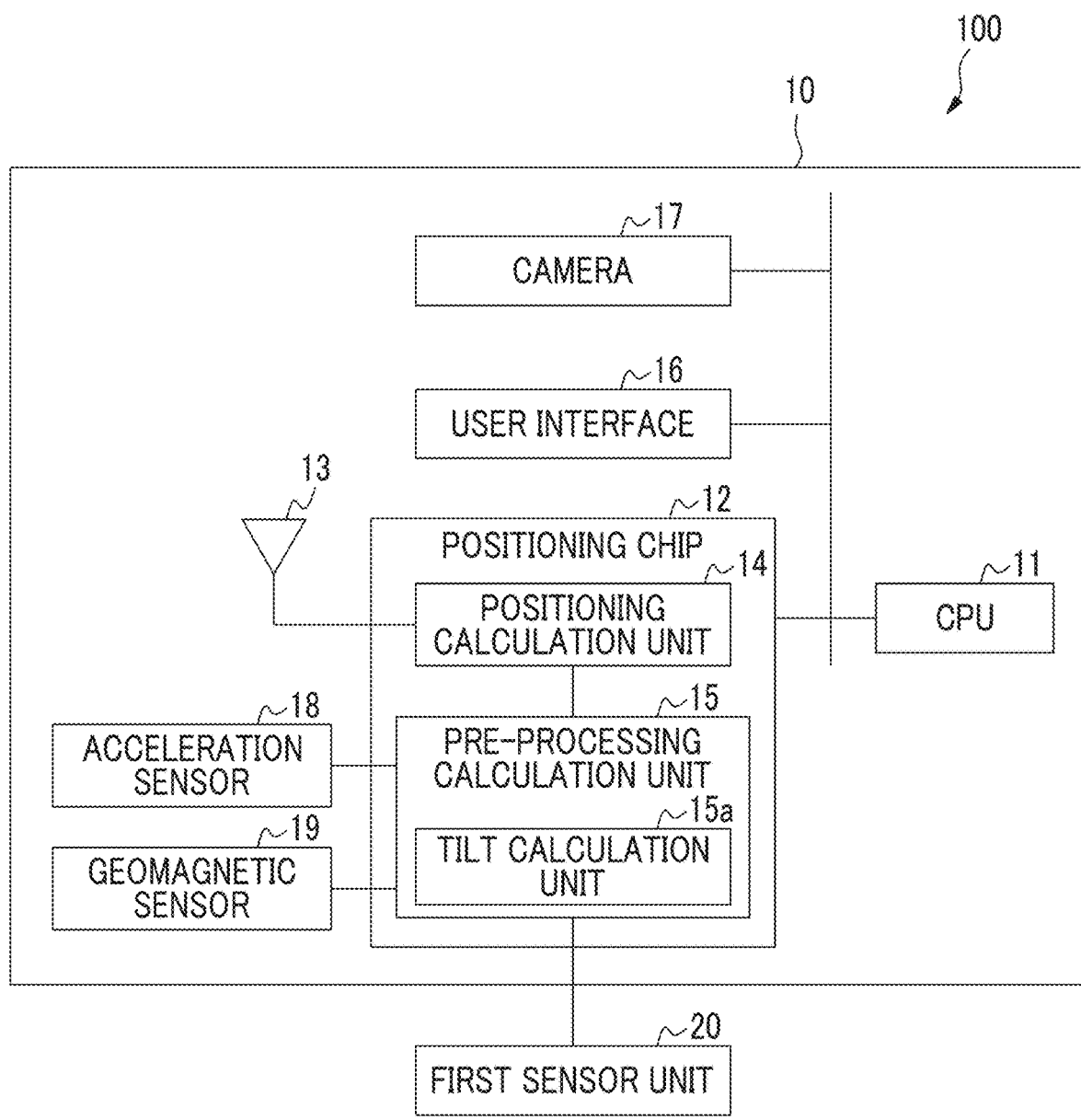
FIG. 2 is a block diagram of the vehicle-mounted device related to the first embodiment of the invention.

As illustrated in FIG. 2, the body part 10 includes a CPU 11, the positioning chip 12 (calculation device), a GNSS antenna 13, a user interface 16, a camera 17, an acceleration sensor 18, and a geomagnetic sensor 19.

In the present embodiment, the body part 10 is fixed to the handle HDL of the two-wheel vehicle BK.

The CPU 11 executes a program to be described below, to acquire positional information of the positioned two-wheel vehicle BK, and executes various applications for driving support, driving analysis, and the like.

The positioning chip 12 acquires the first detection value, and performs calculation on the first detection value. The positioning chip 12 is connected to the GNSS antenna 13, the user interface 16, and the camera 17, respectively.

The positioning chip 12 acquires the current position of the two-wheel vehicle BK on the basis of the radio waves and the various kinds of measurement information that are acquired from the GNSS antenna 13.

The GNSS antenna 13 acquires the radio waves from a plurality of GNSS satellites, and outputs the radio waves to the positioning chip 12.

A user interface 16 performs information input from an operator, and information output to the operator. In the present embodiment, a touch panel, switches, buttons, a display, a loudspeaker, and the like are included as the user interface 16.

The camera 17 captures an image seen from the two-wheel vehicle BK.

In the present embodiment, since the body part 10 is fixed to the handle HDL of the two-wheel vehicle BK, the camera 17 captures an image in a direction in which a direction in which the two-wheel vehicle BK is turned is further rotated at a steering angle of the handle HDL.

The acceleration sensor 18 measures a three-axis acceleration. In the present embodiment, since the body part 10 is fixed to the handle HDL of the two-wheel vehicle BK, the acceleration sensor 18 measures accelerations in the directions of three axes of the handle orthogonal system Qh.

The geomagnetic sensor 19 measures orientation from the direction of the geomagnetism. In the present embodiment, since the body part 10 is fixed to the handle HDL of the two-wheel vehicle BK, the geomagnetic sensor 19 measures the orientation of the handle HDL.

(Calculation Device)

The positioning chip 12 includes a positioning calculation unit 14 and a pre-processing calculation unit 15.

The positioning calculation unit 14 and the pre-processing calculation unit 15 are connected to each other so as to be capable of transmitting and receiving respective kinds of mutual information.

The positioning calculation unit 14 and the pre-processing calculation unit 15 will be described in detail.

(Positioning Calculation Unit)

Details of the positioning calculation unit 14 will be described.

The positioning calculation unit 14 is connected to the GNSS antenna 13 so as to be capable of acquiring the radio waves received by the GNSS antenna 13. The positioning calculation unit 14 is connected to the first sensor unit 20 via the pre-processing calculation unit 15 so as to be capable of acquiring angular velocity information from the first sensor unit 20.

Moreover, the positioning calculation unit 14 is connected to the acceleration sensor 18 via the pre-processing calculation unit 15 so as to be capable of acquiring acceleration information from the acceleration sensor 18. Additionally, the positioning calculation unit 14 is connected to the geomagnetic sensor 19 via the pre-processing calculation unit 15 so as to be capable of acquiring orientation information from the geomagnetic sensor 19.

The positioning calculation unit 14 calculates the current position of the two-wheel vehicle BK on the basis of the radio waves acquired from the GNSS antenna 13.

In the present embodiment, the positioning calculation unit 14 obtains respective times until respective radio waves transmitted from the plurality of GNSS satellites reach the vehicle-mounted device 100 from the acquired radio waves by signal processing. By obtaining distances to the respective GNSS satellites from the respective times, the positioning calculation unit 14 obtains the latitude and longitude of the mounted two-wheel vehicle BK.

Additionally, the positioning calculation unit 14 corrects the position of the two-wheel vehicle BK on the basis of at least the acceleration information acquired from the acceleration sensor 18 and the angular velocity information acquired from the first sensor unit 20. Accordingly, in a case where reception of the radio waves from the GNSS satellites is difficult under the ground, in tunnels, in the shadows of skyscrapers, and the like, the positioning calculation unit 14 performs autonomous navigation (dead reckoning) utilizing the acceleration information acquired by the acceleration sensor 18 and the angular velocity information acquired by the first sensor unit 20.

In the present embodiment, the positioning calculation unit 14 corrects the newest position acquired on the basis of the radio waves from the GNSS satellites with the acceleration information acquired by the acceleration sensor 18 and the angular velocity information acquired by the first sensor unit 20. Accordingly, the positioning calculation unit 14 can estimate the current position even in a case where it is difficult to receive the radio waves from the GNSS satellites.

Hence, irrespective of whether or not the radio waves are received from the GNSS satellites, the vehicle-mounted device 100 performs the positioning of the two-wheel vehicle BK, sequentially acquire the current position of the two-wheel vehicle BK, and performs driving support, driving analysis, and the like in the CPU 11.

(Pre-Processing Calculation Unit)

Details of the pre-processing calculation unit 15 will be described.

The pre-processing calculation unit 15 is connected to the acceleration sensor 18, the geomagnetic sensor 19, and the first sensor unit 20, respectively, so as to be capable of acquire various kinds of detection information acquired therefrom.

The pre-processing calculation unit 15 performs low pass filter processing and correction calculation on the various kinds of detection information acquired from the acceleration sensor 18, the geomagnetic sensor 19, and the first sensor unit 20, respectively.

The pre-processing calculation unit 15 includes a tilt acquisition unit 15a.

The tilt acquisition unit 15a acquires the tilt of the body BD of the two-wheel vehicle BK in a leftward-rightward direction as a tilt angle θ on the basis of the first detection value, as a posture of the body BD of the two-wheel vehicle BK. The tilt acquisition unit 15a corrects the various kinds of detection information acquired from the acceleration sensor 18, the geomagnetic sensor 19, and the first sensor unit 20, with acquired tilt angle θ.

Here the "tilt of the body BD in the leftward-rightward direction" means the tilt of the body BD of the two-wheel vehicle BK with respect to the vertical direction within a YZ plane.

The tilt angle θ is acquired by the processing as follows.

First, the tilt acquisition unit 15a stores the tilt angle as θ in a state where the body BD of the two-wheel vehicle BK stands upright n the vertical direction without being tilted with respect to the horizontal road surface GS.

The tilt acquisition unit 15a sequentially acquires the angular velocity of the Xb-axis among the first angular velocities measured by the first sensor unit 20 on the basis of this state.

The tilt acquisition unit 15a integrates the angular velocity of the Xb-axis acquired by calculation processing once to acquire the tilt angle θ.

Here, the angular velocity of rotation around the Xb-axis is described as "angular velocity of the Xb-axis". Hereinafter, other angular velocities will be described similarly.

The pre-processing calculation unit 15 corrects the angular velocity measured by the first sensor unit 20, assuming that the tilt angle θ being the tilt angle of the first sensor unit 20 in the leftward-rightward direction with respect to the horizontal plane.

For example, a case where the body BD of the two-wheel vehicle BK is turned at an angular velocity ω of the Z-axis with respect to the road surface GS while being tilted at an angle θ with respect to the Z-axis to the right side as the two-wheel vehicle BK is seen from the front will be described.

Figure 3:
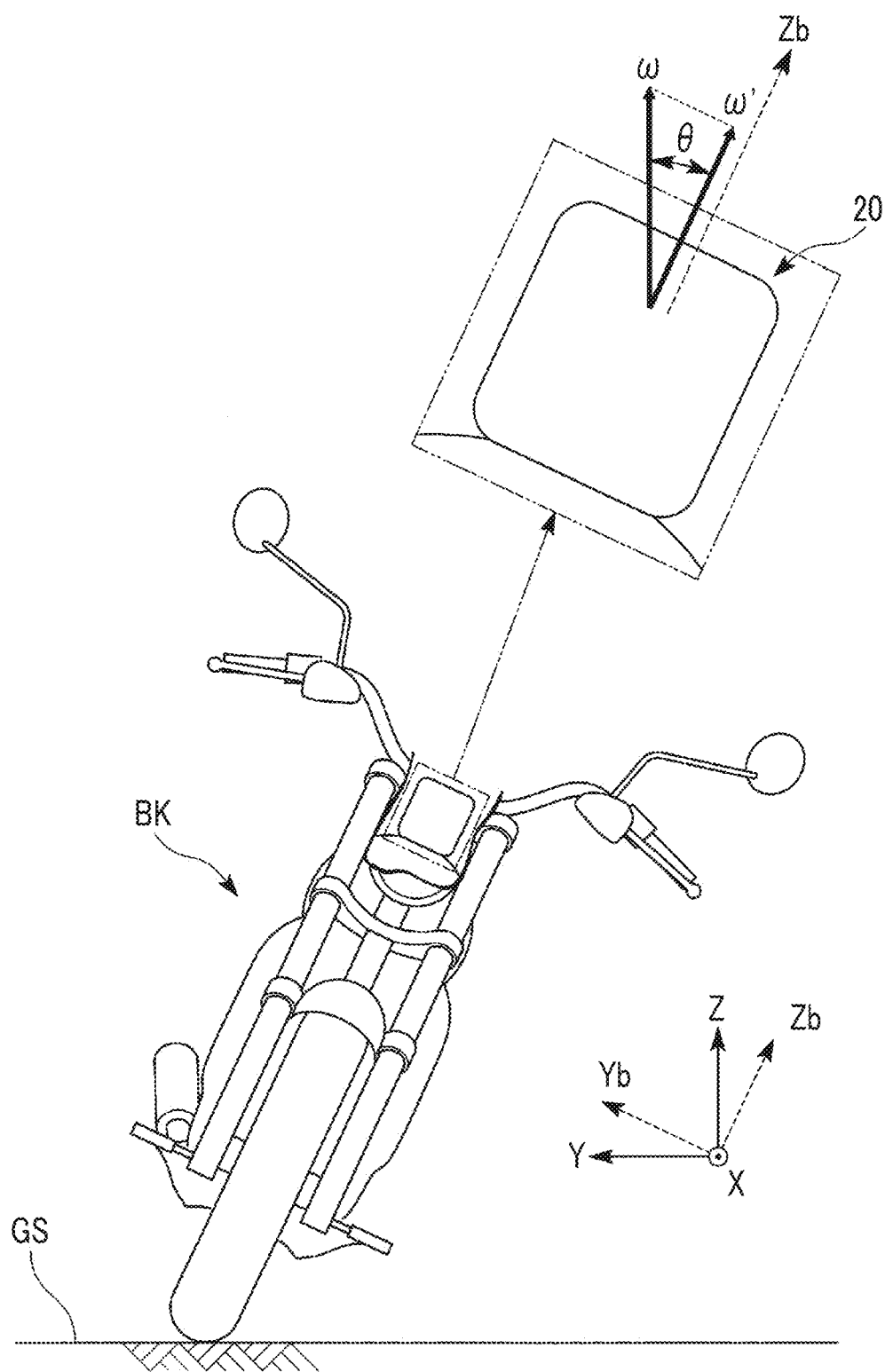
FIG. 3 is a view illustrating an angular velocity detected by the vehicle-mounted device related to the first embodiment of the invention.

As illustrated in FIG. 3, the first sensor unit 20 is tilted at the angle θ along with the tilt of the body BD of the two-wheel vehicle BK, and the body orthogonal system Qb is also tilted at the angle θ along with the tilt of the body B. As a result, the first sensor unit 20 cannot detect the angular velocity only with an angular velocity ω' (=ω cos θ) of a magnitude obtained by projecting an actual angular velocity ω on the Zb-axis of the body orthogonal system Qb.

Hence, in a case where the first sensor unit 20 detects the angular velocity of the Zb-axis as ω' and the tilt acquisition unit 15a detects the tilt angle θ, the pre-processing calculation unit 15 calculates ω=ω'/cos θ to correct the angular velocity ω' to the angular velocity ω. Then, the pre-processing calculation unit 15 outputs the corrected angular velocity ω to the positioning calculation unit 14 as the first detection value.

Similarly, the pre-processing calculation unit 15 can correct the acceleration acquired by the acceleration sensor 18 or the orientation acquired by the geomagnetic sensor 19.

Moreover, in order to compensate for the detection accuracy of the angular velocity of the first sensor unit 20, the pre-processing calculation unit 15 may use the acceleration acquired by the acceleration sensor 18, the orientation acquired by the geomagnetic sensor 19, and the position acquired by the positioning calculation unit 14 on the basis of the radio waves from the GNSS satellites.

For example, in order to exclude the bias of the angular velocity measured by the first sensor unit 20, the acceleration sensor 18, the geomagnetic sensor 19, and the GNSS positioning are utilized. Specifically, the standstill of the two-wheel vehicle BK is detected by the acceleration sensor 18, the geomagnetic sensor 19, and the GNSS positioning, and at that time, the pre-processing calculation unit 15 corrects the angular velocity measured by the first sensor unit 20 such that the angular velocity measured by the first sensor unit 20 is 0.

Function and Effect

Functions and effects of the present embodiment will be described.

The vehicle-mounted device 100 detects the angular velocity by the first sensor unit 20 attached to the body BD of the two-wheel vehicle BK. For this reason, even if the GNSS antenna 13, the user interface 16, and the camera 17 are mounted on the handle HDL of the two-wheel vehicle BK, the vehicle-mounted device 100 can detect the angular velocity in association with the tilt of the body BD of the two-wheel vehicle BK.

A case where the first sensor unit 20 detects the angular velocity of the Zb-axis will be described in comparison regarding the present embodiment and a reference example.

As the reference example, it is assumed that the first sensor unit 20 is attached to the handle HDL.

Figure 4:
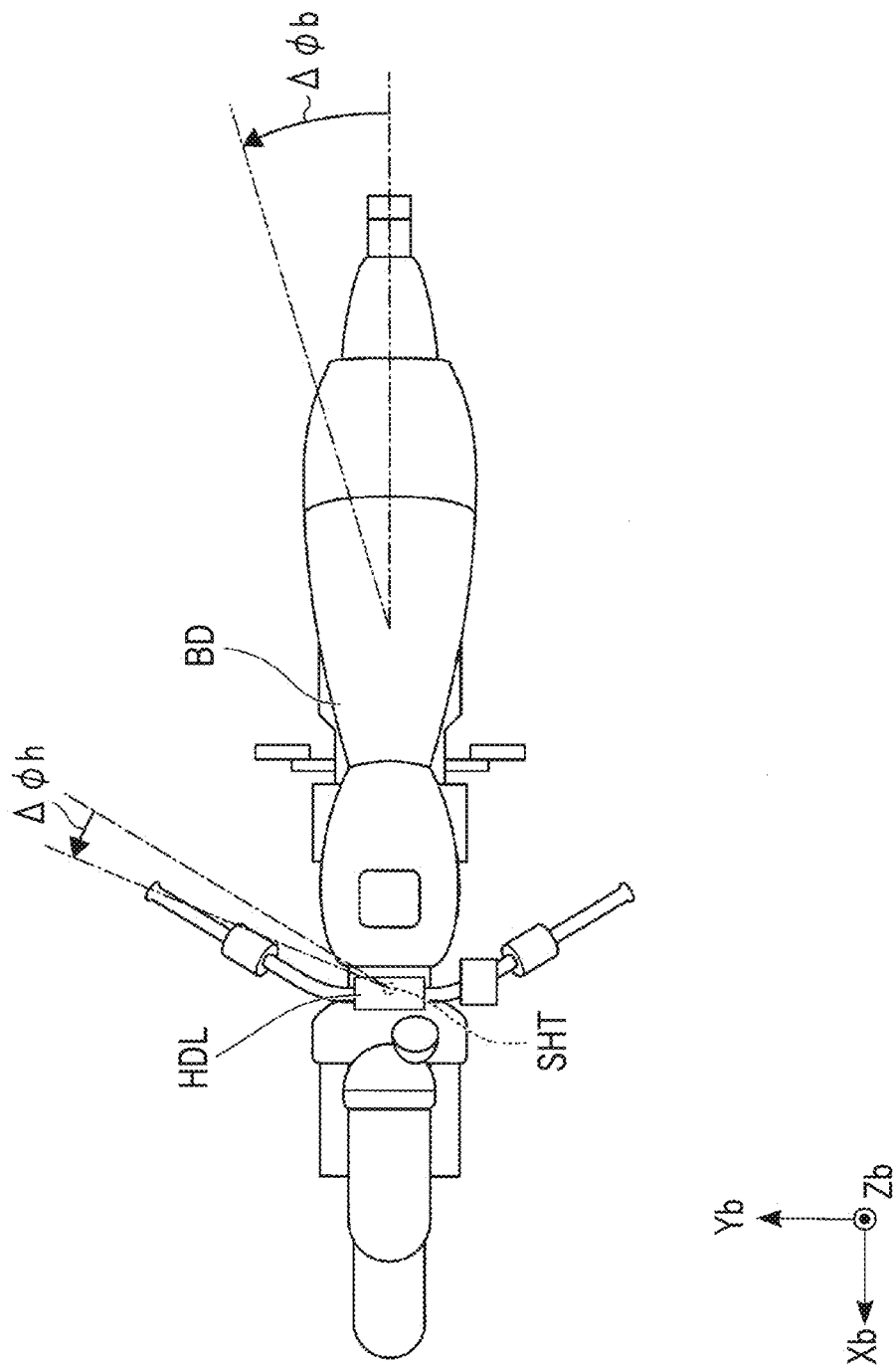
FIG. 4 is a view illustrating the magnitude of the angular velocity detected by the vehicle-mounted device related to the first embodiment of the invention.

As illustrated in FIG. 4, it is assumed that, in a minute time Δt, the body BD rotates at an angle Δϕb around an axis along the Zb-axis with respect to the road surface GS, and the handle HDL rotates at an angle Δϕh around an axis along the Zb-axis with respect to the body BD.

In this case, the magnitude of the angular velocity around the axis along the Zb-axis of the body BD with respect to the road surface GS is Δϕb/Δt.

Additionally, the magnitude of the angular velocity around the axis along the Zb-axis of the handle HDL with respect to the body BD is Δϕh/Δt.

The first sensor unit 20 detects the angular velocity of the Zb-axis with the road surface GS as a stationary system. Thus, in the case of the reference example, the magnitude of the angular velocity detected by the first sensor unit 20 is (Δϕh+Δϕb)/Δt, and the angular velocity of the handle HDL is mixed.

In contrast, in the case of the present embodiment, the first sensor unit 20 is attached to the body BD. Thus, the magnitude of the angular velocity detected by the first sensor unit 20 is Δϕb/Δt, and the magnitude of the angular velocity of the body BD itself is detected.

Hence, since the first sensor unit 20 of the present embodiment can detect the angular velocity of the body BD itself, the angular velocity to be detected is not easily influenced by the movement of the handle HDL of the two-wheel vehicle BK.

On the other hand, a component that is more convenient if being present on the handle HDL is mounted on the handle HDL.

For example, since the user interface 16 is mounted on the handle HDL of the two-wheel vehicle BK, a structure in which a driver tends to access the user interface 16 is obtained. Additionally, since the GNSS antenna 13 is mounted on the handle HDL of the two-wheel vehicle BK, the vehicle-mounted device 100 can provide the driver with the navigation adapted to the movement of the handle HDL of the two-wheel vehicle BK. Moreover, since the camera 17 is mounted on the handle HDL of the two-wheel vehicle BK, the capturing of the vehicle-mounted device 100 adapted to the movement of the handle HDL of the two-wheel vehicle BK is allowed.

Since the vehicle-mounted device 100 detects the angular velocity in association with the tilt of the body BD of the two-wheel vehicle BK, the vehicle-mounted device 100 can acquire the tilt of the body BD of the two-wheel vehicle BK from the detected angular velocity.

Hence, the vehicle-mounted device 100 can correct the tilt of the body BD of the two-wheel vehicle BK with respect to the acquired angular velocity, acceleration, and orientation.

Second Embodiment

A second embodiment of an vehicle-mounted device related to the invention will be described with reference to FIGS. 5 and 6.

The vehicle-mounted device of the present embodiment is basically the same as the first embodiment, but is different from the first embodiment in that angular-velocity sensors are provided not only in the body BD of the two-wheel vehicle BK but also in the handle HDL of the two-wheel vehicle BK to acquire the steering angle of the handle HDL. Differences will be described in detail below.

An entire configuration of a vehicle-mounted device 100' will be described.

Figure 5:
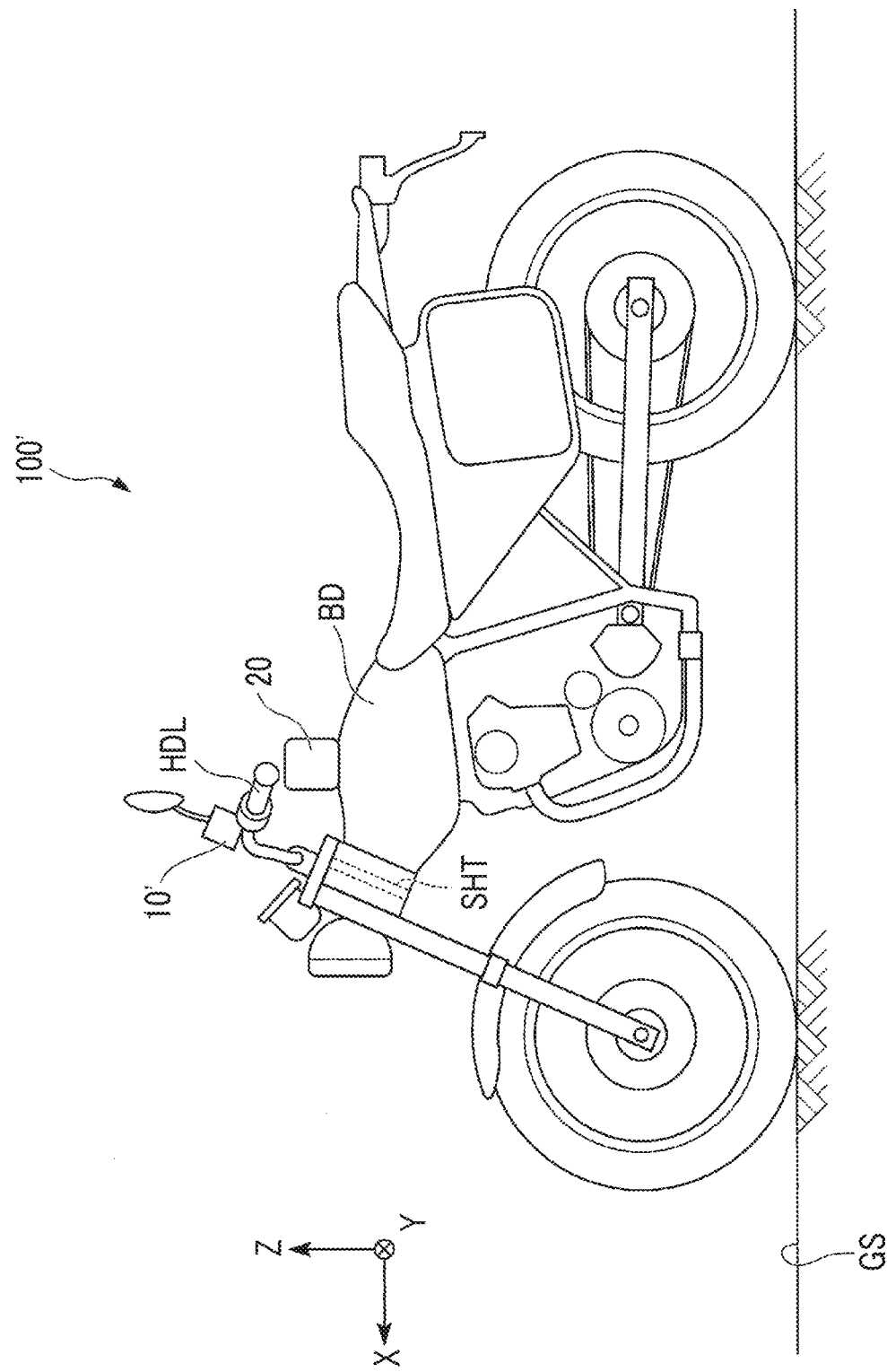
FIG. 5 is a schematic view of a vehicle-mounted device related to a second embodiment of the invention.

In the present embodiment, the vehicle-mounted device 100' is a vehicle navigation system, and as illustrated in FIG. 5, is provided in the two-wheel vehicle BK. The vehicle-mounted device 100' is separately attached to at least two portions of a portion provided in the handle HDL of the two-wheel vehicle BK and a portion provided in the body BD.

The vehicle-mounted device 100' includes a body part 10' and the first sensor unit 20.

In the present embodiment, the body part 10' is attached to the handle HDL of the two-wheel vehicle BK, and the first sensor unit 20 is attached to the body BD of the two-wheel vehicle BK.

The body part 10' and the first sensor unit 20 are connected to each otter by a wired or wireless communication line for transmission and reception of respective kinds of information.

Details of the body part 10' will be described.

Figure 6:
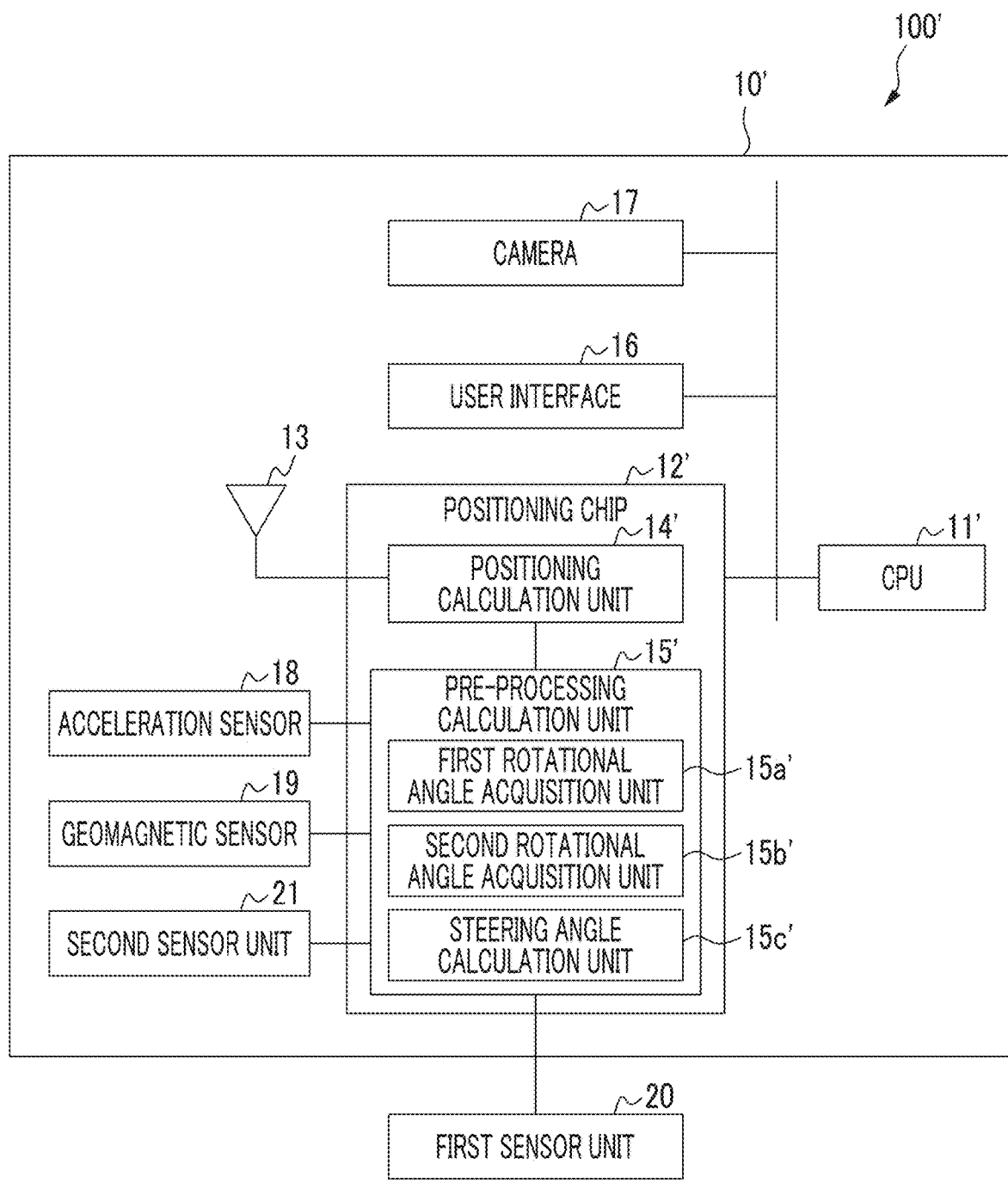
FIG. 6 is a block diagram of the vehicle-mounted device related to the second embodiment of the invention.

As illustrated in FIG. 6, the body part 10 includes a CPU 11', a positioning chip 12' (calculation device), the GNSS antenna 13, the user interface 16, the camera 17, the acceleration sensor 18, the geomagnetic sensor 19, and second sensor unit 21.

In the present embodiment, the body part 10' is fixed to the handle HDL of the two-wheel vehicle BK.

The CPU 11' executes a program to be described below, to acquire positional information of the positioned two-wheel vehicle BK, and executes various applications for driving support, driving analysis, and the like.

The positioning chip 12' acquires the first detection value, and performs calculation on the first detection value. The positioning chip 12' is connected to the GNSS antenna 13, the user interface 16, the camera 17, and the second sensor unit 21, respectively.

The positioning chip 12' acquires the current position of the two-wheel vehicle BK on the basis of the radio waves and the various kinds of measurement information that are acquired from the GNSS antenna 13.

The second sensor unit 21 detects a second angular velocity to be described below, as a second detection value.

In the present embodiment, the second sensor unit 21 has a gyro sensor, and measures a three-axis angular velocity.

Additionally, in the present embodiment, the body part 10' is fixed to the handle HDL of the two-wheel vehicle BK, the second sensor unit 21 is fixed to the handle HDL of the two-wheel vehicle BK. For this reason, the second sensor unit 21 measures three-axis angular velocities along respective axes of the Xh-axis, the Yh-axis, and the Zh-axis of the handle orthogonal system Qh.

The second sensor unit 21 detects the measured second angular velocity as the second detection value, and outputs the second detection value to the positioning chip 12'.

Details of the positioning chip 12' will be described.

The positioning chip 12' includes a positioning calculation unit 14' and a pre-processing calculation unit 15'.

The positioning calculation unit 14' and the pre-processing calculation unit 15' are connected to each other so as to be capable of transmitting and receiving respective kinds of mutual information.

The positioning calculation unit 14' is connected to the second sensor unit 21 via the pre-processing calculation unit 15' so as to be capable of acquiring angular velocity information from the second sensor unit 21.

The pre-processing calculation unit 15' is connected to the acceleration sensor 18, the geomagnetic sensor 19, the first sensor unit 20, and the second sensor unit 21, respectively, so as to be capable of acquire various kinds of detection information to be acquired therefrom.

The pre-processing calculation unit 15' performs low pass filter processing and correction calculation on the various kinds of detection information acquired from the acceleration sensor 18, the geomagnetic sensor 19, the first sensor unit 20, and the second sensor unit 21, respectively.

The pre-processing calculation unit 15' includes a first rotational angle acquisition unit 15a', a second rotational angle acquisition unit 15b, and a steering angle calculation unit 15c'.

The first rotational angle acquisition unit 15a' acquires the first detection value, and acquires a first rotational angle on the basis of the first detection value, as a posture of the body BD of the two-wheel vehicle BK.

The second rotational angle acquisition unit 15b' acquires the second detection value, and acquires a second rotational angle on the basis of the second detection value, as a posture of the handle HDL of the two-wheel vehicle BK.

The steering angle calculation unit 15c' calculates and outputs the steering angle of the handle HDL with respect to the body BD on the basis of the first rotational angle and the second rotational angle.

Specifically, the acquisition is made as follows.

First, the first rotational angle acquisition unit 15a' stores the rotational angles of the respective angles of the body BD of the two-wheel vehicle BK as 0 of the two-wheel vehicle BK in a state where the body BD of the two-wheel vehicle BK stands upright in the vertical direction without being tilted with respect to the horizontal road surface GS.

The first rotational angle acquisition unit 15a' sequentially acquires the first angular velocities of the respective axes measured by the first sensor unit 20 on the basis of this state.

The first rotational angle acquisition unit 15a' integrates once the first angular velocities of the respective axes acquired by the calculation processing, respectively, to acquire rotational angles of the respective axes of the body BD of the two-wheel vehicle BK.

Accordingly, the first rotational angle acquisition unit 15a' can obtain the posture of the body BD of the two-wheel vehicle BK by acquiring the rotational angles of the respective axes of the body BD of the two-wheel vehicle BK.

Similarly, the second rotational angle acquisition unit 15b' stores the rotational angles of the respective axes of the handle HDL of the two-wheel vehicle BK as 0 in a state where the body BD of the two-wheel vehicle BK stands upright in the vertical direction without being tilted with respect to the horizontal road surface GS.

The second rotational angle acquisition unit 15b' sequentially acquires the second angular velocities of the respective axes measured by the second sensor unit 21 on the basis of this state.

The second rotational angle acquisition unit 15b' integrates once the second angular velocities of the respective axes acquired by the calculation processing, respectively, to acquire rotational angles of the respective axes of the handle HDL of the two-wheel vehicle BK.

Accordingly, the second rotational angle acquisition unit 15b' can obtain the posture of the handle HDL of the two-wheel vehicle BK by acquiring the rotational angles of the respective axes of the handle HDL of the two-wheel vehicle BK.

The steering angle calculation unit 15c' obtains the difference of the posture of the handle HDL of the two-wheel vehicle BK with respect to the posture of the body BD of the two-wheel vehicle BK as a relative posture angle, using a quaternion or a rotation matrix.

For example, in a case where the relative posture angle is obtained using the quaternion, the steering angle calculation unit 15c' obtains the relative posture angle, using the calculation of the following Formula (1) to Formula (3).

[Equation 1]
$$\tilde{q} \quad (1)$$

[Equation 2]
$$\tilde{q}^* \quad (2)$$

[Equation 3]
$$r' = \tilde{q} r \tilde{q}^* \quad (3)$$

Here, Formula (1) is a quaternion to be obtained, and is a quaternion for rotation from the posture of the body BD of the two-wheel vehicle BK to the posture of the handle HDL of the two-wheel vehicle BK.

Formula (2) is a quaternion that becomes a complex conjugate of Formula (1).

r is a posture vector of the body BD of the two-wheel vehicle BK, and is associated with the rotational angles of the respective axes of the body BD of the two-wheel vehicle BK acquired by the first rotational angle acquisition unit 15a'.

r' is a posture vector of the handle HDL of the two-wheel vehicle BK, and is associated with the rotational angles of the respective axes of the handle HDL of the two-wheel vehicle BK acquired by the second rotational angle acquisition unit 15b'.

The steering angle calculation unit 15c' obtains Formula (1) as a quaternion that satisfies Formula (3).

As a modification example, the steering angle calculation unit 15c' may further obtain the relative posture angle, using the calculation of the following Formulas (4) and (5).

[Equation 4]
$$\tilde{q}_k \quad (4)$$

[Equation 5]
$$\tilde{q} = \tilde{q}_{N-1} \ldots \tilde{q}_2 \tilde{q}_1 \quad (5)$$

Formula (4) is a quaternion representing a rotation in a k-th step among respective time steps.

By obtaining a quaternion at each time and obtaining the product of a quaternion representing a rotation in each time step as shown in the following Formula (5), the steering angle calculation unit 15c' obtains a quaternion for rotation from the posture of the body BD of the two-wheel vehicle BK to the posture of the handle HDL of the two-wheel vehicle BK.

Functions and effects of the present embodiment will be described.

The vehicle-mounted device 100' can detect the steering angle of the handle HDL of the two-wheel vehicle BK. For this reason, vehicle-mounted device 100' can add steering angle information to the acquired information. For example, the vehicle-mounted device 100' can acquire the steering angle of the handle HDL when an image is captured by the camera 17.

Additionally, the vehicle-mounted device 100' can perform driving analysis utilizing a relationship between the steering angle and the angular velocity or acceleration of the body of the vehicle. For example, on the basis of a relationship between the tilt of the body BD of the two-wheel vehicle BK and the steering angle of the handle HDL when turning a curve, the vehicle-mounted device 100' can evaluate the skill of a driving vehicle and the performance of the two-wheel vehicle BK.

Moreover, the vehicle-mounted device 100' can also improve the accuracy of the positioning by adding the steering angle information to the calculation of the positioning.

Modification Example

Modification examples of the above respective embodiments will be described below.

In the above respective embodiments, the acceleration sensor 18, the geomagnetic sensor 19, and the GNSS antenna are provided in the handle HDL of the two-wheel vehicle BK.

As a modification example, at least one of the acceleration sensor 18, the geomagnetic sensor 19, and the GNSS antennas may not be in the handle HDL of the two-wheel vehicle BK.

In the above respective embodiments, the GNSS antenna 13, the user interface 16, and the camera 17 are all attached to the handle HDL.

As a modification example, any configuration may be adopted as long as a vehicle-mounted device has a configuration in which at at least one of the GNSS antenna 13, the user interface 16, and the camera 17 is attached to the handle HDL.

A vehicle-mounted device with high convenience is configured by attaching at least one of the GNSS antenna 13, the user interface 16, and the cameras 17 to the handle HDL.

In the above respective embodiments, the GNSS antenna is provided in the handle HDL of the two-wheel vehicle BK.

However, The effect that any antenna is not easily influenced by the movement of the handle HDL of the two-wheel vehicle BK similarly to the GNSS antenna is obtained.

Hence, as a modification example, a vehicle-mounted device may be configured such that at least an antenna is provided in the handle HDL of the two-wheel vehicle BK, without being limited to the GNSS antenna.

For example, a vehicle-mounted device may be configured such that at least a DSRC antenna to be used for a dedicated short range communications (DSRC) system is provided in the handle HDL of the two-wheel vehicle BK.

In the above respective embodiments, the first sensor unit 20 detects the three-axis angular velocity. However, as a modification example, the first sensor unit 20 may have a three-axis acceleration sensor, and may detect a three-axis acceleration as the first acceleration.

In this case, since the three-axis acceleration sensor is attached to the body BD of the two-wheel vehicle BK, the vehicle-mounted device can calculate the rotation of the posture of the body BD of the two-wheel vehicle BK from the three-axis acceleration.

Additionally, by attaching the three-axis acceleration sensor to the body BD of the two-wheel vehicle BK, the vehicle-mounted device can detect the three-axis acceleration of the body BD of the two-wheel vehicle BK so as not to be influenced by the movement of the handle HDL. For example, as long as the acceleration of the body BD of the two-wheel vehicle BK in the forward-backward direction is detectable so as not to be influenced by the movement of the handle HDL, evaluation of a brake of the two-wheel vehicle BK is allowed.

Moreover, as another modification example, the first sensor unit 20 may have a configuration in which a three-axis angular velocity sensor and the three-axis acceleration sensor are combined together.

That is, the first sensor unit 20 has at least one of the angular velocity and the acceleration of the two-wheel vehicle BK.

Similarly, in the above second embodiment, the second sensor unit 21 has the gyro sensor and detects the three-axis angular velocity. However, as a modification example, the second sensor unit 21 may have the three-axis acceleration sensor, and may detect a three-axis acceleration as the second acceleration. In this case, the second sensor unit 21 calculates the rotation of the posture of the handle HDL of the two-wheel vehicle BK from the three-axis acceleration.

Moreover, as another modification example, the second sensor unit 21 may have a configuration in which the three-axis angular velocity sensor and the three-axis acceleration sensor are combined together.

That is, the second sensor unit 21 has at least one of the angular velocity and the acceleration of the two-wheel vehicle BK.

In the above respective embodiments, the positioning calculation unit and the pre-processing calculation unit are integrally provided within the positioning chip. However, as a modification example, the positioning calculation unit and the pre-processing calculation unit may be provided in separate chips. In that case, the positioning calculation unit and the pre-processing calculation unit are connected to each other by a wired or wireless communication line for transmission and reception of respective kinds of information.

In the above respective embodiments, the positioning chip includes the positioning calculation unit and the pre-processing calculation unit. However, as a modification example, a computer may be made to function as the positioning calculation unit and the pre-processing calculation unit by executing a program to be described below.

Although the pre-processing calculation unit of the first embodiment and the pre-processing calculation unit of the second embodiment have different configurations in the above respective embodiments, these may be combined with each other.

For example, in the first embodiment, the second sensor unit 21 may be further provided in the body part 10, and the first rotational angle acquisition unit 15a', the second rotational angle acquisition unit 15b', and the steering angle calculation unit 15c' may be further provided in the pre-processing calculation unit 15.

In the above respective embodiments, the body part is attached to the handle HDL of the two-wheel vehicle BK and the first sensor unit is attached to the body BD of the two-wheel vehicle BK. However, these may be provided in any type of vehicle without being limited to the two-wheel vehicle BK.

As a modification example, the body part may be attached to a steering wheel of a four-wheel car, and the first sensor unit may be attached to the body BD of the four-wheel car.

In addition, in the respective embodiments, programs for realizing the various functions of the CPU and the computer are recorded on computer-readable recording media, and a computer system is made to read in and execute the programs recorded on the recording media. Here, processes of processing of the CPU of the computer system are stored in the computer-readable recording media in the form of the programs, and the above processing is performed as the computer reads and executes the programs. Additionally, the computer-readable recording media means a magnetic disc, a magneto-optical disc, a CD-ROM, a DVD-ROM, a semiconductor memory, and the like. Additionally, these computer programs may be distributed to the computer by communication lines, and the computer that has received this distribution may be made to execute the programs.

Although the several embodiments of the invention have been described above, these embodiments are merely illustrative examples and are not intended to limit the scope of the invention. These embodiments can be carried out in other various forms, and various omissions, substitutions, and alternations can be performed without departing from the spirit of the invention. These embodiments and their modifications are embraced in the scope of the invention and its equivalent as defined in the claims, similar to those embraced in the scope and spirit of the invention.

INDUSTRIAL APPLICABILITY

Even if the vehicle-mounted device of the invention is mounted on the steering unit of the vehicle, the acceleration or the angular velocity to be detected is not easily influenced by the movement of the steering unit of the vehicle.

REFERENCE SIGNS LIST

10: body part
10': body part
11: CPU
11': CPU
12: positioning chip (calculation device)
12': positioning chip (calculation device)
13: GNSS antenna
14: positioning calculation unit
14': positioning calculation unit
15: pre-processing calculation unit
15': pre-processing calculation unit
15a: tilt acquisition unit
15a': first rotational angle acquisition unit
15b': second rotational angle acquisition unit
15c': steering angle calculation unit
16: user interface
17: camera
18: acceleration sensor
19: geomagnetic sensor
20: first sensor unit
21: second sensor unit
100: vehicle-mounted device
100': vehicle-mounted device
SHT: handle shaft
BD: body
BK: two-wheel vehicle
GS: road surface
HDL: handle

The invention claimed is:

1. A vehicle-mounted device that is mounted on a vehicle having a body and a steering unit supported on the body via a steering shaft, the vehicle mounted device comprising:
   a user interface, a camera, or an antenna that is attached to the steering unit;
   a first sensor unit that is attached to the body and detects a first angular velocity or a first acceleration as a first detection value;
   a calculation device that performs a calculation based on the first detection value and is connected to the user interface, the camera, or the antenna; and
   a second sensor unit that is attached to the steering unit and detects a second angular velocity or a second acceleration as a second detection value,
   wherein the calculation device comprises a steering angle calculation unit that calculates a steering angle of the steering unit with respect to the body on the basis of the first detection value and the second detection value.

2. The vehicle-mounted device according to claim 1, wherein the steering angle calculation unit calculates, as the steering angle, a difference of a second rotational angle of the steering unit obtained from the second detection value with respect to a first rotational angle of the body obtained from the first detection value.

3. The vehicle-mounted device according to claim 1, wherein the vehicle is a two-wheel vehicle.

4. A calculation device for a vehicle-mounted device that is mounted on a vehicle having a body and a steering unit supported on the body via a steering shaft and includes a user interface, a camera, or an antenna that is attached to the steering unit; a first sensor unit that is attached to the body and detects a first angular velocity or a first acceleration as a first detection value; and a second sensor unit that is attached to the steering unit and detects a second angular velocity or a second acceleration as a second detection value, the calculation device comprising:
   a first rotational angle acquisition unit that acquires the first detection value and acquires a first rotational angle on the basis of the first detection value;
   a second rotational angle acquisition unit that acquires the second detection value and acquires a second rotational angle on the basis of the second detection value; and
   a steering angle calculation unit that calculates and outputs a steering angle of the steering unit with respect to the body on the basis of the first rotational angle and the second rotational angle.

5. A non-transitory computer-readable recording medium that stores a program for a computer of a vehicle-mounted device that is mounted on a vehicle having a body and a steering unit supported on the body via a steering shaft and includes a user interface, a camera, or an antenna that is attached to the steering unit; a first sensor unit that is attached to the body and detects a first angular velocity or a first acceleration as a first detection value; and a second sensor unit that is attached to the steering unit and detects a second angular velocity or a second acceleration as a second detection value, the program causing the computer to function as:
   a first rotational angle acquisition unit that acquires the first detection value and acquires a first rotational angle on the basis of the first detection value;
   a second rotational angle acquisition unit that acquires the second detection value and acquires a second rotational angle on the basis of the second detection value; and
   a steering angle calculation unit that calculates and outputs a steering angle of the steering unit with respect to the body on the basis of the first rotational angle and the second rotational angle.

* * * * *